Oct. 3, 1944.  N. M. JONES  2,359,648
UNITARY COUPLING FOR PLURAL CONDUITS
Filed March 3, 1943
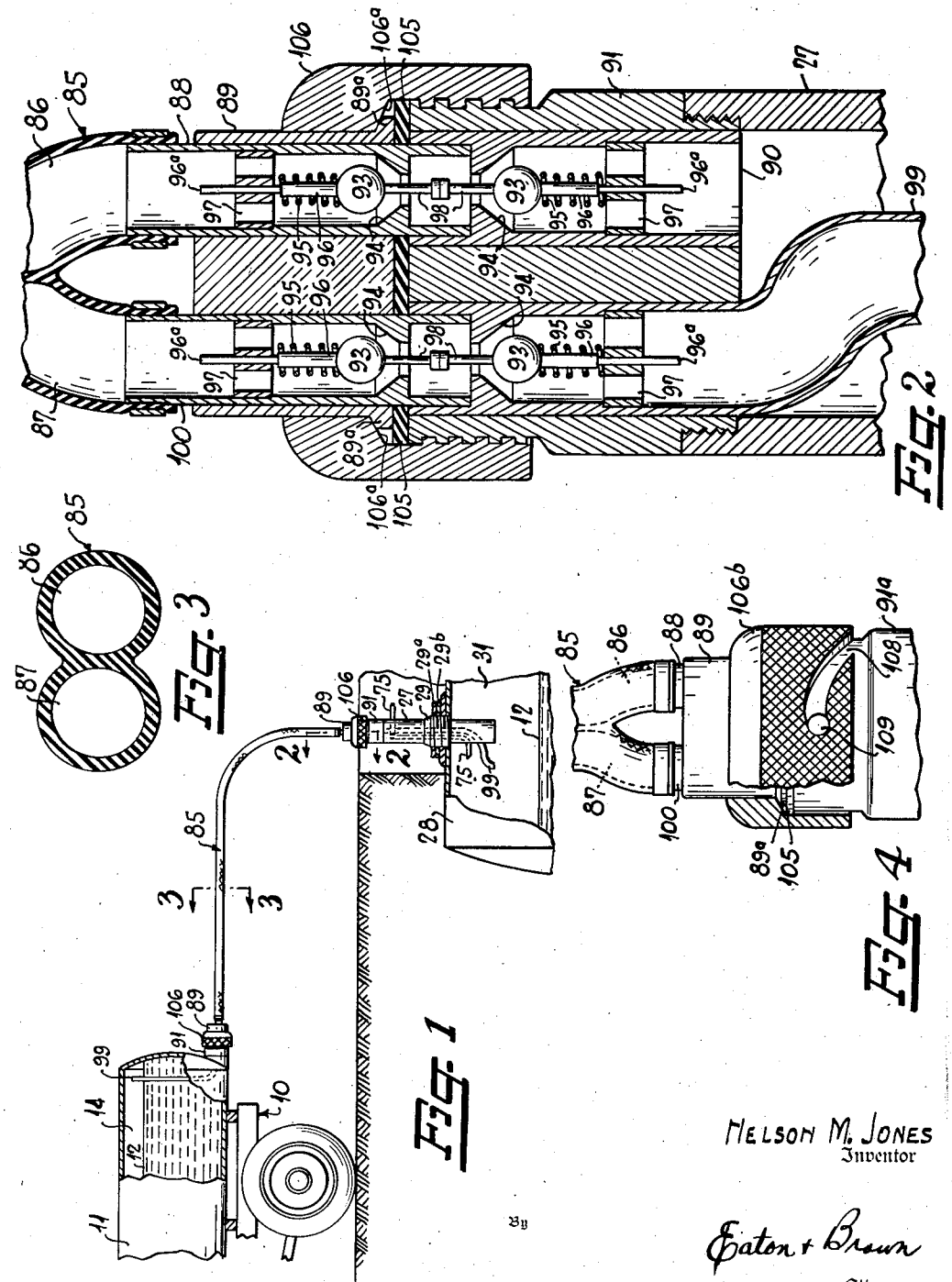
Nelson M. Jones
Inventor
Eaton + Brown
Attorneys Patented Oct. 3, 1944

2,359,648

UNITED STATES PATENT OFFICE 2,359,648

UNITARY COUPLING FOR PLURAL CONDUITS

Nelson M. Jones, Sarasota, Fla., assignor to Green's Fuel, Incorporated, Sarasota, Fla., a corporation of Florida Application March 3, 1943, Serial No. 477,815

2 Claims. (Cl. 284—4)

This invention relates to pipe and hose couplings and more particularly to couplings adapted to be used in connection with fuel delivery systems such as disclosed in my co-pending patent application Serial Number 473,555, filed January 25, 1943, now Patent Number 2,348,478, granted May 9, 1944.

It is an object of this invention to provide a unitary coupling for fuel delivery systems whereby two or more delivery conduits must be simultaneously connected or disconnected to or from a like number of intake conduits leading to a storage tank, reservoir, or the like.

It is another object of this invention to provide mechanism for coupling together two or more pipes or other conduits, said coupling being fitted onto the ends of the conduits to be joined together, so that it is impossible to connect one of the conduits without connecting the other associated conduit or conduits. This is especially adaptable for use in transferring liquid petroleum gas from a delivery or truck tank to an underground or other tank located at a lower level. As a safety feature, when the liquid is passed from one tank into another tank, there should be a vapor return hose leading from the receiving tank to the discharging tank, so that as vapor is displaced in the receiving tank by liquid being discharged thereinto, the vapor displaced by said liquid should be returned to the other discharging tank. In liquefied petroleum gas systems, where the liquid is conveyed to the customer's premises, and delivered into a receiving tank which is usually an underground tank, it has been a practice of many truck drivers to vent the vapor from the receiving tank into the air instead of connecting the vapor return hose to the receiving tank, so that the displaced vapor will return to the discharging tank. The release of gas vapor into the surrounding premises is a great fire hazard. By providing the delivery hose with a unitary coupling in which the ends of the delivery hose are securely fixed and by providing means whereby this fitting is fixed onto a companion fitting on the pipe or pipes rising from the receiving tank, it thus becomes impossible for liquid to be delivered into the receiving tank without also returning the vapor from the receiving tank into the discharging tank.

Some of the objects of the invention having been stated, other objects will appear as the description proceeds, when taken in connection with the accompanying drawing, in which:

Figure 1 is a view illustrating the combination of a fuel supply tank, a storage tank, and a double conduit hose between the tanks in which my improved coupling is employed;

Figure 2 is an enlarged vertical sectional view taken along the line 2—2 in Figure 1;

Figure 3 is a transverse sectional view through the double conduit hose, and taken along line 3—3 in Figure 1;

Figure 4 is an elevation, with certain portions thereof shown in section and other portions broken away, illustrating a slightly modified form of fastening means for detachably securing the adjacent elements of a coupling together.

Referring more particularly to the drawing, the numeral 10 broadly denotes a truck having a tank 11 mounted on the rear portion thereof. This tank is adapted to contain a supply of liquid 12 such as propane, butane, and the like. Usually the tank is not completely filled, but instead, a vapor space 14 is provided in the upper portion thereof to allow for expansion and contraction as well as variation in liquid volume due to temperature changes.

Figures 1 to 3 inclusive illustrate a fuel distributing system employing my improved coupling. The delivery tank 11 is coupled to the storage tank 28 by means of a unitary twin hose 85. At each end of this hose, my improved coupling is employed. Since the coupling structure at each end of the hose is identical, the detailed structure at the lower end thereof will be described only.

By observing Figures 2 and 3, it will be noted that the hose 85 has passageways 86 and 87 therethrough, the passageway 86 being employed to conduct liquid fuel 12 from the tank 11 into the tank 28, and the passageway 87 being employed to convey the displaced vapor from tank 28 into the space 14 in the upper portion of tank 11. The lower end of passageway 86 communicates with the upper end of a pipe 88, said pipe 88 being fixedly secured in a cylindrical block 89. The lower end of pipe 88 telescopically fits into the upper end of a similar pipe 90 which is fixedly mounted in a second cylindrical block 91, said block 91 being threadably secured in the upper end of fill pipe 29. There is an identical block 91 threadably secured to tank 11.

The proximate ends of the pipes 88 and 90 have normally closed ball valves 93 disposed therein, there being a ball valve in each of said pipes. Each of the ball valves 93 is adapted to engage a seat 94, when closed, to thereby prevent the flow of liquid or other material therethrough. In order to normally hold each of the ball valves 93 in a seated or closed position, a compression spring 95 is mounted around a valve stem 96, which stem extends from ball 93. Each of the stems 96 has a restricted stem portion 96a which is slidably mounted in a spider 97 within each of the pipes 88 and 90.

When the pipes 88 and 90 are in a coupled position, a liquid conduit is provided between the tank 14 and a tank 28 disposed at a lower level than tank 14. This liquid conduit comprises a set of pipes 90 and 88 at each end of passageway 86.

In order to provide means for automatically opening the ball valves 93 when the coupling is in connected position as shown in Figure 6, suitable pins 98 extend from the proximate faces of the ball valves 93, and the proximate ends of these pins engage each other to cause the valves 93 to be unseated and thus open the liquid conduit through the coupling at pipes 88 and 90. Due to the fact that the stem portion 96a is slightly smaller than the stem portion 96, a shoulder is provided adjacent the spider 97, which shoulder serves as a stop when the valve 93 has opened the maximum amount. This shoulder serves to equalize the action of the springs 95. For example, if one spring should be weaker than the other, then the valve having the weaker spring would be prevented by the associated shoulder from opening very much more than the valve having the stronger spring.

The displaced vapor from the tank 28 flows therefrom by way of a pipe 99, said pipe 99 extending upwardly on the interior of fill pipe 29 and having its upper end fixedly secured in cylindrical block 91. The upper end of pipe 99 has the lower end of a pipe 100 telescopically mounted therein, said pipe 100 being identical to the pipe 88 previously described. The upper end of pipe 100 communicates with passageway 87 in hose 85. The vapor conduit is therefore designated by reference characters 99, 100, and 87. Another set of members 100 and 99 are disposed adjacent the supply tank 11 and on the upper end of hose unit 85.

The valve structures within pipes 99 and 100 are identical to the valve structures employed in pipes 90 and 88 respectively. Therefore, similar reference characters will be given to like parts without making a detailed description. It might be stated, however, that these valves operate in the same automatic manner, therefore, when the pipes 100 and 99 are connected, as shown in Figure 6, the valves will be automatically opened to permit vapor to flow upwardly from the tank 28 through the vapor conduit and when the pipes 100 and 99 are disconnected, these valves will be automatically closed.

In order to provide a sealed joint between blocks 89 and 91, a suitable washer or gasket 105 is provided between these members. Also a nut 106 is rotatably mounted around cylindrical member 89, which nut is interiorly threaded near its lower end for releasably engaging the cylindrical block 91 therebelow. Of course, the shouldered portion 106a of the nut 106 engages outwardly disposed flange 89a of block 89 to thereby bind or clamp the block 89 to the block 91 when the nut 106 is threadably secured in position.

Figure 4 shows a slightly modified form of mechanism for releasably securing the coupling members together. This form of the invention differs from the preceding form in that the upper portion of cylindrical block 91 is unthreaded, and therefore, this member is designated by reference character 91a in Figure 4. Also the interior of nut 106 is left unthreaded and therefore is designated by reference character 106b in Figure 4. Nut 106b has a pair of opposed bayonet slots 108 therein, only one of which is shown, which slots are adapted to releasably engage pins 109 extending from the outer periphery of the block 91a. The other parts of the coupling are identical. This figure illustrates a convenient means whereby the blocks 89 and 81a may be more quickly attached or detached from each other.

In Figure 1 a coupling is shown adjacent the truck tank, which is similar, if not identical to the coupling adjacent the receiving or storage tank. In all of these instances, the coupling adjacent the truck tank could be eliminated and the two hose connected to two nipples extending from the truck tank, but in the drawing, there has been shown indentical couplings at the two ends of the hose, so as to make the ends of the hose interchangeable, and also to permit easy renewal of the hose unit. In practice, the hose system remains coupled to the truck tank at all times, and when the consumer's premises are reached, the hose system, which is full of liquid and vapor is connected to the pipe or pipes rising from the underground tank, and delivery of liquid into the storage tank and return of the vapor to the truck tank takes place. Regardless of the form of coupling used, it is impossible for a careless operator to deliver liquid into a storage tank without venting the vapor from the storage tank into the truck tank.

In the drawing and specification, there has been set forth a preferred embodiment of the invention, and although specific terms are employed, they are used in a generic and descriptive sense only and not for purposes of limitation, the scope of the invention being defined in the claims.

I claim:

1. A coupling for connecting a pair of pipes disposed side-by-side to a second pair of pipes disposed side-by-side comprising a fitting secured to and surrounding each pair of pipes, each fitting having alined passageways therethrough with one end of the passageways communicating with the respective pair of pipes, means for releasably securing the fittings in end to end relation, so that the two passageways in one fitting register with the two passageways in the other fitting, each passageway in each fitting having a spring pressed valve normally biased to closed position, each valve having a stem extending from each of the opposed sides thereof, the stems of the valve in coinciding passageways being adapted to engage each other to move the valves to open position when the fittings are secured to each other in end to end relation, and shoulder means on the stems for limiting the amount a valve can be moved to open position before the other valve in a pair of coinciding passageways is caused to move to open position.

2. In a coupling comprising two separable parts for connecting one pair of pipes to a second pair of pipes, one of the parts being exteriorly threaded and the other part having an interiorly threaded sleeve slidably mounted thereon for threading onto the exteriorly threaded portion of the first-named part, each part having a pair of parallel passageways therein adapted to coincide with a pair of parallel passageways in the other part, each of the passageways having a valve seat therein, and also having a spider member therein, a spring-pressed valve having a stem slidably mounted in the spider member in each passageway, and normally biased to be moved by its associated spring to closed position on its seat, each of the valves having a pin extending from the other side thereof, the proximate pins of each of the valves of each part being adapted to engage each other when the parts are joined together to move the valves against their springs to open position, each of the valve stems mounted in the spiders having stop means thereon for engaging the spider for limiting the amount the valve can be opened, so that when the parts are joined together and one of a pair of valves in coinciding openings is opened a predetermined amount, the other valve will then be opened on account of the stop means.

NELSON M. JONES.